May 7, 1968 R. J. BERGMAN 3,382,491

MATED-THIN-FILM MEMORY ELEMENT

Filed Oct. 23, 1965 2 Sheets-Sheet 1

INVENTOR
ROBERT J. BERGMAN

Thomas J. Nikolai
ATTORNEY

May 7, 1968 R. J. BERGMAN 3,382,491

MATED-THIN-FILM MEMORY ELEMENT

Filed Oct. 23, 1965 2 Sheets-Sheet 2

INVENTOR
ROBERT J. BERGMAN
BY Thomas J. Nikolai
ATTORNEY

United States Patent Office 3,382,491

Patented May 7, 1968

3,382,491

MATED-THIN-FILM MEMORY ELEMENT

Robert J. Bergman, Univac Park, St. Paul, Minn. 55116

Filed Oct. 23, 1965, Ser. No. 504,008
9 Claims. (Cl. 340—174)

ABSTRACT OF THE DISCLOSURE

A magnetizable memory element that includes two thin-ferromagnetic-film layers each layer having an aperture therethrough forming a first closed flux path thereabout to drive fields generated by energized first drive lines passing through said apertures. Each of the two layers have superposed first portions that form a memory area which first portions envelop a second drive line and which first portions have sides overlapping the enveloped drive line. The overlapping sides form closely coupled portions on both sides of said enveloped drive line creating a substantially closed second flux path about the enveloped drive line wherein said first and second flux paths are orthogonal to each other in said memory area.

The present invention is an improvement in the mated-film memory element disclosed in the copending patent application of K. H. Mulholland, Ser. No. 498,743 filed Oct. 20, 1965. The copending Mulholland application discloses a mated-film element that includes two thin-ferromagnetic-film layers that are formed in a stacked, superposed relationship about a suitable drive line and whose overlapping sides form closely coupled portions creating a substantially closed flux path about the enveloped drive line. The enveloped drive line is typically a common bit and sense line used to sense the element's output during the readout operation and to carry bit current during the write operation. The axis of anisotropy, or easy axis, is in the circumferential direction about the enveloped drive line, i.e., orthogonal to the longitudinal axis of the enveloped drive line, whereby the energized enveloped drive line provides a longitudinal drive field $H_l$ in a circumferential direction about the enveloped drive line in the area of the mated-film element causing the flux in the two layers in the mated-film element to become aligned in an antiparallel relationship. A second drive line, preferably a printed circuit member, running over and returning under the mated-film element is oriented with its longitudinal axis parallel to the easy axis of the mated-film element whereby the enveloping drive line when energized by an appropriate current signal produces a transverse drive field $H_t$ in the area of the mated-film element. The resulting product constitutes a memory cell that possesses all the desirable characteristics of a planar, thin-ferromagnetic-film memory element while being substantially unaffected by the creep phenomenon.

The copending patent application of R. J. Bergman et al., Ser. No. 504,543, filed Oct. 24, 1965, discloses an improvement of the copending patent application of Mulholland wherein the enveloping word line of the Mulholland application is replaced by a word line that envelops the mated-film element but is oriented in the area of the mated-film element with its longitudinal axis orthogonal to the plane of and to the easy axis of the mated-film element whereby the enveloping word line when energized by appropriate current signals produces a transverse drive field $H_t$ in the area of the mated-film element. Additionally, there is provided a planar layer of high permeability material that is stacked above and that is parallel to the plane of the mated-film element for providing a low reluctance, substantially closed flux path for the transverse drive field $H_t$ provided by the energized word line. The high permeability layer has an aperture between the enveloping word line in the area of the mated-film element whereby the flux provided by the energized word line passes through the high permeability layer but due to the aperture in the high permeability layer in the area of the mated-film element such flux is caused to pass through the layers of the mated-film element in a direction transverse to the easy axis thereof.

The present invention is a further improvement of such copending applications in that there is provided herein a mated-film memory element wherein the thin-ferromagnetic-film layers that form the mated-film element also provide the closed flux path for the energized word line drive fields thus eliminating the high permeability layer of the R. J. Bergman et al. application. The elimination of this additional high permeability layer provides thereby a mated-film element that may be formed by any one of various well-known fabrication techniques.

The thin-ferromagnetic-film layers of the preferred embodiment have single domain properties although such is not required by the present invention. The term "single domain property" may be considered the magnetic characteristic of a three-dimensional element of magnetizable material having a thin dimension that is substantially less than the width and length thereof wherein no magnetiic domain walls can exist parallel to the large surface of the element. The term "magnetizable" material shall designate a substance having a remanent magnetic flux density that is substantially high, i.e., approaches the flux density at magnetic saturation.

Accordingly, it is the primary object of this invention to provide a novel memory element and the method of packaging thereof.

It is a further object of this invention to provide a magnetizable memory element that includes two thin-ferromagnetic-film layers each layer having an aperture therethrough forming a first closed flux path thereabout to drive fields generated by energizing first drive lines through said apertures. Each of the two layers have superposed, first portions that form a memory area which first portions envelop a second drive line and which first portions have sides overlapping the enveloped drive line which overlapping sides form closely coupled portions on both sides of said enveloped drive line creating a substantially closed second flux path about the enveloped drive line wherein said first and second flux paths are orthogonal to each other in said memory area.

These and other more detailed and specific objectives will be disclosed in the following specification, reference being had to the accompanying drawings in which.

Figure 1:
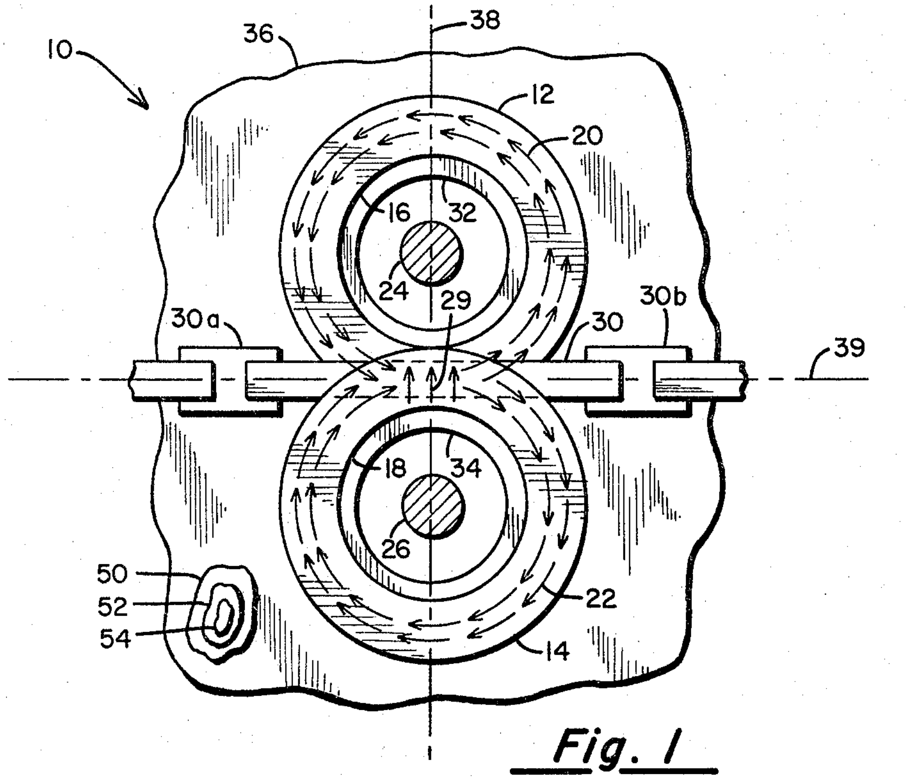
FIG. 1 is an illustration of a plan view of the memory element of the present invention.

With particular reference to FIG. 1 there is presented an illustration of a plan view of a mated-film element of the present invention. As discussed hereinabove, and in more detail in the above discussed copending patent application of K. H. Mulholland, the mated-film element achieves its unique output characteristic, as compared to coupled-film elements, due to the sandwiched arrangement of the thin-ferromagnetic-film layers and the enveloped drive line. Element 10 is comprised of at least two thin-ferromagnetic-film layers 12 and 14 having two apertures 16 and 18, respectively, therethrough forming two closed flux paths for transverse word drive fields $H_t$ identified by arrows 20 and 22, respectively, generated by energized word drive lines 24 and 26. Each of the layers 12 and 14 have superposed portions that form a memory area 28 (see FIG. 3) which superposed portions envelop a bit drive line 30 and which superposed portions have sides overlapping the enveloped drive line 30. Layers 12 and 14 are symmetrically oriented about apertures 32 and 34, respectively, in substrate 36 about major axis 38 and along minor axis 39.

Drive line 30 is, as stated above, symmetrically oriented along axis 39 and about axis 38 and sandwiched between superposed portions of layers 12 and 14 in the area of memory area 28. The two superposed portions of layers 12 and 14 that overlap drive line 30 form at their overlapping sides closely coupled portions that create a substantially closed flux path about the enveloped drive line 30 for longitudinal drive fields $H_l$ of a first or second and opposite polarity as developed by an energized drive line 30. Such longitudinal drive fields $H_l$ are identified by arrows 29 of a first or second and opposite polarity flowing in a circumferential direction orthogonal to the longitudinal axis of drive line 30, which first or second and opposite directions are representative of a stored "1" or "0" in memory area 28 of element 10. Additionally, layers 12 and 14 are formed possessing the characteristic of uniaxial anisotropy having a sufficiently high anisotropic constant $H_k$ with their anisotropic axes, or easy axes, oriented parallel to axis 38 and with their hard axes oriented orthogonal to axis 38 or parallel to axis 39.

Figure 2:
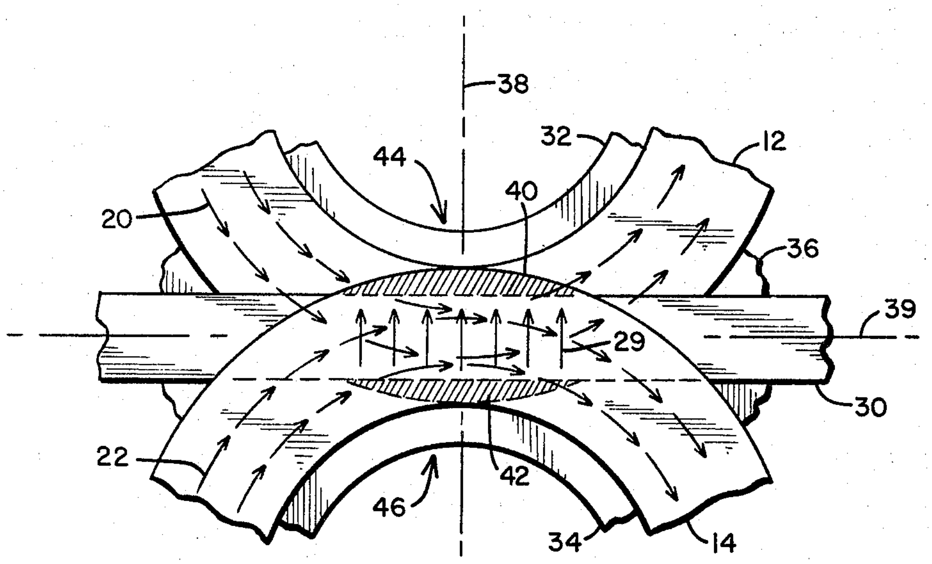
FIG. 2 is an enlarged illustration of the overlapping portions of the magnetizable layers of FIG. 1.

With particular reference to FIG. 2 there is presented an enlarged illustration of the overlapping portions of layers 12 and 14 forming the memory area 28 of element 10. Such superposed portions of layers 12 and 14 that overlap the enveloped bit line 30 are identified by the dark outlined areas 40 and 42 while the planar outline of memory area 28 is clearly shown by the ellipse formed by the overlapping outside radii of layers 12 and 14, which area 28 includes portions 40 and 42 along its sides.

Element 10 may be formed by any one of the plurality of well-known methods of fabricating magnetizable memory elements; for discussion of some such methods see the copending patent applications of W. W. Davis, Ser. No. 254,913, filed Jan. 30, 1963, and P. E. Oberg et al., Ser. No. 332,220, filed Dec. 20, 1963, both assigned to the same assignee as is the present invention. Due to the continuous nature of layers 12 and 14 such layers do not lend themselves to a continuous deposition process—see the copending patent application of R. P. Halverson, Ser. No. 503,364, filed Oct. 23, 1965, for such an embodiment. However, layers 12 and 14 may be vapor deposited upon substrate 36 by use of a suitable mask having the outline of the major radius of layers 12 and 14 and centered about apertures 32 and 34 in substrate 36. Layers 12 and 14 may after the deposition process be suitably etched to define the internal contours 16 and 18, respectively, and to remove the vapor deposited magnetizable material from the walls of apertures 32 and 34, respectively, particularly in the areas 44 and 46, respectively, in the vicinity of areas 40 and 42, respectively, where a more-than-necessary build-up of magnetizable material would deleteriously affect the memory operation of element 10.

Element 10 is formed in the preferred embodiment in the following steps;

A. The base element of element 10 is planar glass substrate 36 of 0.006 inch thickness that has a pair of spaced-apart apertures 32, 34 therethrough; apertures 32, 34 provide the openings through which word lines 24, 26 pass perpendicularly through the plane of substrate 36. Axes 38, 39 are here utilized only to define the major and minor axes, respectively, of element 10 for purposes of orienting the elements and magnetic axes thereof.

B. Upon substrate 36 and about aperture 32 is formed a toroidal shaped thin-ferromagnetic-film layer 12 of 4,000 Angstroms (A.) in thickness and of approximately 80% Ni–20% Fe and having an anisotropic axis aligned with axis 38 providing an easy axis thereby.

C. Next, an insulating layer 50 may be laid down upon the assembly of layer 12 and subtsrate 36. If a vapor deposition process is utilized layer 50 may consist of a silicon monoxide (SiO) layer of 5,000 A. in thickness that is deposited on the assembly of layer 12 and substrate 36. Additionally, insulating layer 50 may consist of a Mylar sheet of 0.005 inch in thickness affixed to the assembly of layer 12 and substrate 36 by a suitable adhesive.

D. Next, upon layer 50 and centered along axis 39 and about axis 38 is laid down copper drive line 30 which may be of approximately 40,000 A. in thickness. If element 10 is to be formed in a continuous deposition process it may be necessary, due to the limiting characteristics of the drive line 30 defining mask, to lie down two copper interconnecting strips **30*a*, 30*b* of approximately 40,000 A. in thickness to provide electrical continuity between a plurality of elements 10 aligned along axis 39**.

E. Next, an insulating layer 52, similar to layer 50 of Step C above, may be laid down upon the assemblage.

F. Next, upon layer 52 and about aperture 34 in substrate 36 is laid down layer 14 which is substantially similar to layer 12 of Step B above.

G. Lastly, an insulating layer 54, which may be similar to layers 50 and 52 of Steps C and E above, is laid down over the entire stacked assembly for the sealing thereof.

It has been found by the applicant that the insulating layers 50, 52 of SiO provide poor electrical insulating characteristics between the magnetizable layers and the copper bit line in the area of area 28 when element 10 is fabricated in a continuous deposition process. Due to the changing environmental conditions (temperature, pressure, etc.) within the evacuatable enclosure during the deposition process and to the irregular surfaces of the metallic layers of the layers of SiO may develop pin-hole and crack-like apertures therethrough through which the currents flowing through the bit line may short through to the metallic layers. Consequently, to ensure desirable operations thereof when element 10 is fabricated in a continuous deposition process, each element 10 is electrically insulated from each other by no two elements 10 having common magnetizable material whereby there is precluded the possibility of the shorting of parallel, adjoining line 30 and lines **30*a* and 30*b*. Further, as word lines 24, 26 may be uninsulated copper wires it is desirable that no magnetizable material be permitted to form on or to be deposited along the walls of apertures 32, 34 in substrate 36 so as to permit the shorting of a word line 24, 26 through the magnetizable layers 12, 14**.

As stated above the layers of SiO provided by the continuous deposition process provide poor electrical insulating characteristics. However, the layers of SiO are essential in the continuous deposition process to prevent the diffusion of the layers of magnetizable material and copper, particularly in the area of memory area 28. With the magnetic characteristic of memory area 28 being critical to the proper operation of element 10 it is essential that the diffusion between such metals be prevented. Accordingly, although such layers of SiO are not relied upon to provide electrical insulating characteristics therebetween such layers are utilized to preclude contamination of the magnetizable layers during the continuous deposition process if such process is utilized in the fabrication of element 10.

It is desirable that no magnetizable material be permitted to form upon the walls of aperture 32, 34 of substrate 36 for reasons other than to preclude the possibility of the shorting of a word line 24, 26 to a bit line 30. As disclosed in the aforementioned K. H. Mulholland application area 28 is the memory or active area of element 10 in which the binary information is written and from which the binary information is read. As the magnetizable material in the mated-film areas defined by the dark outlined areas 40, 42 of FIGURE 2 play no or little part in providing an output signal to bit line 30 but do provide an area of high permeability, i.e., low reluctance, to the transverse drive field $H_t$ represented by the arrows 20, 22 of FIG. 1, it is desirable that the amount of magnetizable material in the mated-film areas be kept to a minimum such that the transverse drive field $H_t$ provided by the energized word drive lines 24, 26 be concentrated in the area of memory area 28 contiguous to bit line 30. Accordingly, it is desirable that no magnetizable material be formed in areas 44, 46 along the walls of apertures 32, 34 in substrate 36 and that the amount of magnetizable material in the mated-film areas defined by the dark outlined areas 40 and 42 of FIG. 2 be kept to a minimum consistant with requirements of producibility and operability of element 10.

Figure 3:
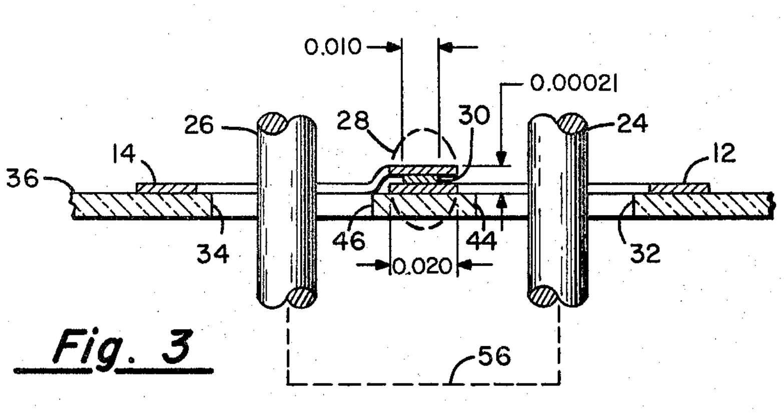
FIG. 3 is a diagrammatic illustration of a cross section of the memory area of the memory element of FIG. 1.

With particular reference to FIG. 3 there is presented a diagrammatic illustration of a cross-section of element 10 taken along axis 38 of FIGURE 1 with the passive members such as insulating layers 50, 52 and 54 omitted for the sake of clarity. FIG. 3 points out the approximate dimensions of the memory area 28 of element 10 of the illustrated embodiment as indicating a width-to-thickness ratio of approximately 100. Further, there are illustrated the vertically oriented word lines 24, 26 whose longitudinal axes are orthogonal to the planes of layers 12 and 14, and which pass centrally through apertues 32, 34 of substrate 36. Additionally, there is illustrated schematically a conductive strip 56 which electrically intercouples the bottom ends of word lines 24, 26 forming a continuous electrical circuit thereby. Lastly, there is identified the portions 44, 46 of apertures 32, 34, respectively, that are in the vicinity of mated-film areas 40, 42, respectively, in which it is particularly desirable that no excess magnetizable material be permitted to be deposited or formed.

The memory plane assembly formed by the sandwiched construction of substrate 38 through layer 54 (not including word lines 24, 26) is an integral package and may be formed in any one of the plurality of well-known fabricating techniques. In the illustrated embodiment each of the magnetizable layers 12 and 14 are formed with an anisotropic axis parallel to axis 38 whereby a current signal coupled to drive line 30 establishes longitudinal drive field $H_l$, particularly in layers 12 and 14 in memory area 28, in the circumferential direction about bit line 30 of a first or a second and opposite direction representative of a stored "1" or "0" as a function of the polarity of the current signal applied thereto. With the proper current signal coupled to intercoupled word lines 24, 26 (by a conductive strip 56, see FIG. 3) there is established in area 28 a transverse drive field $H_t$ that tends to align the magnetization M of layers 12 and 14, in the area of area 28, into substantial alignment along the hard axis of area 28, i.e., that lies along a line parallel to axis 39.

With reference again to FIG. 1 there is illustrated a plane view of element 10 that illustrates the general configuration of the path of the magnetic flux generated by current signals flowing through word lines 24, 26 and bit line 30. When a suitable current signal is coupled to word lines 24, 26 there is established about such word lines a magnetic field represented by arrows 20, 22 flowing in the circumferential direction thereabout. This circumferential field about lines 24, 26 seeks a path of low reluctance, and, accordingly, concentrates in the paths presented by layers 12 and 14. Further, with a suitable current signal coupled to bit line 30 there is established in the area of area 28 a magnetic field represented by arrows 29 flowing in a circumferential direction about bit line 30 of a first or a second and opposite direction representative of a stored "1" or "0" as a function of the polarity of the current signal applied thereto. This magnetic flux in the area of area 28 is a longitudinal drive field $H_l$ oriented parallel to the easy axis of area 28 that is aligned with axis 38, and it tends to cause the magnetization M of area 28 to become aligned with axis 38. With the magnetic fields schematically illustrated by arrows 20, 22 and 29 established by suitable current signals flowing through word lines 24, 26 and 30, being, in the area of area 28, in substantial alignment with axis 39 and axis 38, respectively, there are provided two magnetic fields orthogonal to each other in the area of area 28 that are vectorially additive such that by the proper selection of the relative field intensities the magnetization M of area 60 may be established into any one of a plurality of previously determined magnetic states in the rotational mode disclosed in the S. M. Rubens et al. Patent No. 3,030,612.

Figure 4:
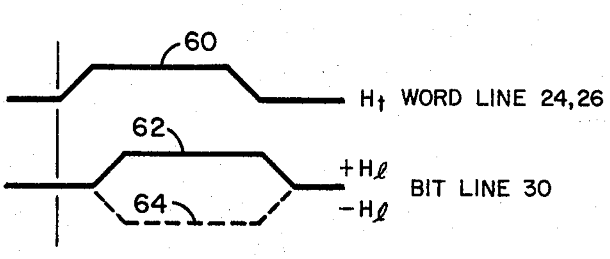
FIG. 4 is an illustration of the signal waveforms associated with the writing operation of the element of FIG. 1.

With particular respect to FIG. 4 there are illustrated the waveforms of the current signals utilized to accomplish the writing operation of element 10. In this arrangement transverse drive field 60 is initially applied to element 10 by a current signal flowing through word lines 24, 26 rotating the magnetization M of area 28 out of alignment with its anisotropic axis 38. Next, longitudinal drive field 62 for the writing for a "1" or a longitudinal drive field 64 for the writing of a "0" is applied to area 28 by suitable polarity current signals coupled to bit line 30 which longitudinal drive field $H_l$ steers the magnetization of area 60 into the particular magnetic polarization along anisotropic axis 38 that is associated with the respective polarity of waveforms 64, 62.

Figure 5:
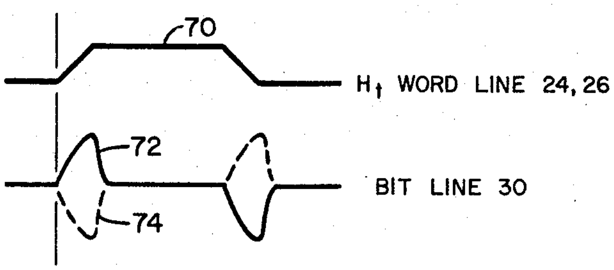
FIG. 5 is an illustration of the signal waveforms associated with the reading operation of the element of FIG. 1.

With particular respect to FIG. 5 there are illustrated the signal waveforms associated with the reading operation of element 10. The readout operation is accomplished by the coupling of an appropriate current signal to word lines 24, 26 thus generating in the area of area 28 a transverse drive field that is below the reversible limit of the memory area 60 and that only rotates the magnetization of area 60 out of alignment with its anisotropic axis 38 inducing in common bit-sense line 30 output signal 72 or 74 indicative of a stored "1" or "0," respectively, in area 28. As illustrated here the polarity phase of the output signal during the readout operation is indicative of the informational state of the memory element 10 concerned.

Thus, it is apparent that there has been described and illustrated herein a preferred embodiment of the present invention that provides a novel memory and method of packaging thereof that provides an improved volumetric efficiency requiring decreased drive current intensities over prior art arrangements. It is understood that suitable modifications may be made in the structure as disclosed provided that such modifications come within the spirit and scope of the appended claims. Having now fully illustrated and described my invention, what I claim to be new and desire to protect by Letters Patent is set forth in the appended claims.

What is claimed is:

1. A magnetizable memory element comprising:
a substrate member having first and second apertures there through forming a web therebetween;
first and second layers of a magnetizable material;
said first and second layers forming first and second closed flux paths about said first and second apertures, respectively;
a conductive strip sandwiched between and enveloped by superposed portions of said first and second layers in the area of said web for forming a memory area thereby; and,
said layers having side portions overlapping said enveloped conductive strip for forming closely coupled portions creating a substantially closed flux path about said enveloped conductive strip in said memory area.

2. A magnetizable memory element comprising:
a substrate member having first and second apertures therethrough forming a web therebetween;

first and second, planar, thin-ferromagnetic-film layers each of a similar magnetizable material having single domain properties and possessing the characteristic of uniaxial anisotropy for providing an easy axis along which the layer's remanent magnetization shall reside;

said first and second film layers forming first and second closed flux paths about said first and second apertures, respectively;

a conductive strip sandwiched between and enveloped by superposed portions of said first and second film layers in the area of said web for forming a memory area thereby;

said film layers' superposed portions having sides overlapping said enveloped conductive strip for forming closely coupled mated-film portions creating a substantially closed flux path about said enveloped conductive strip in said memory area; and, said easy axes of said film layers aligned orthogonal to the longitudinal axis of said conductive strip and in the substantially closed flux path circumferential-direction about said conductive strip in said memory area.

3. A magnetizable memory element wholly formable by a continuous vapor deposition process within an evacuatable enclosure, comprising:

an electrically insulating, planar substrate member;

said substrate member having first and second apertures therethrough and forming a web therebetween;

a first thin-ferromagnetic-film layer of magnetizable material having single domain properties and possessing the property of uniaxial anisotropy for providing in the plane of said layer an easy axis along which the layer's remanent magnetization shall reside in a first or second and opposite direction;

said first film layer affixed to said substrate number and oriented about said first aperture forming a first closed flux path thereabout;

a first insulating layer affixed to and superposed said first film layer at least in the area of said web;

a conductive strip affixed to said first insulating layer having its longitudinal axis oriented through said web;

a second insulating layer affixed to and superposed at least a portion of said conductive strip;

a second thin-ferromagnetic-film layer of magnetizable material having single domain properties and possessing the property of uniaxial anisotropy for providing in the plane of said layer an easy axis along which the layer's remanent magnetization shall reside in a first or second and opposite direction;

said second film layer affixed to said substrate member and oriented about said second aperture forming a second closed flux path thereabout;

said first and second film layers having superposed central portions positioned in the area of said web for sandwiching and enveloping said conductive strip therebetween with said central portions having sides overlapping and enveloping said conductive strip at at least a portion of said conductive strip for forming closely coupled mated-film portions on opposing sides of said conductive strip for creating a substantially-closed flux path about said enveloped conductive strip;

said superposed central portions and said enveloped conductive strip forming a memory area; and binary information stored in said memory area in a first or second and opposite circumferential flux direction about said enveloped conductive strip and along said layers' easy axes.

4. A magnetizable memory element partially formable by a continuous vapor deposition process within an evacuatable enclosure, comprising;

an electrically insulating, planar substrate member having orthogonally arranged major and minor axes in the plane thereof;

said substrate member having first and second apertures therethrough and oriented symmetrically along said major axis and about said minor axis;

a first thin-ferromagnetic-film layer of magnetizable material having single domain properties and possessing the property of uniaxial anisotropy for providing in the plane of said layer an easy axis along which the layer's remanent magnetization shall reside in a first or second and opposite direction along said major axis;

said first film layer affixed to said substrate number and oriented about said first aperture forming a first closed flux path thereabout;

a first insulating layer affixed to and superposed said first film layer at least in the area of said minor axis;

a conductive strip affixed to said first insulating layer having its longitudinal axis oriented along said minor axis and about said major axis;

a second insulating layer affixed to and superposed at at least a portion of said conductive strip;

a second thin-ferromagnetic-film layer of magnetizable material having single domain properties and possessing the property of uniaxial anisotropy for providing in the plane of said layer an easy axis along which the layer's remanent magnetization shall reside in a first or second and opposite direction along said major axis;

said second film layer affixed to said substrate member and oriented about said second aperture forming a second closed flux path thereabout;

said first and second film layers having superposed central portions positioned about said minor axis for sandwiching and enveloping said conductive strip therebetween with said central portions having sides overlapping and enveloping said conductive strip at at least a portion of said conductive strip for forming closely coupled mated-film portions on opposing sides of said conductive strip for creating a substantially closed flux path about said enveloped conductive strip and along said major axis;

said superposed central portions and said enveloped conductive strip forming a memory area;

binary information stored in said memory area in a first or second and opposite circumferential flux direction about said enveloped conductive strip and along said major axis;

first and second intercoupled word lines passing through said apertures and enveloping said memory area;

an energized said first and second word line generating first and second planar magnetic fields, respectively, thereabout which planar fields are conducted along the closed flux path presented by said first and second film layers and into said memory area as additive fields that are orthogonal to said major axis;

an energized said enveloped conductive strip generating in said memory area first or second and opposite direction circumferential magnetic fields about said conductive strip and along said major axis, said planar magnetic fields and said circumferential magnetic fields vectorially additive in said memory area for setting the magnetization of said memory area in a first or second and opposite circumferential direction about said enveloped conductive strip and along said major axis in a single domain rotational mode as a first or second informational state, respectively; and said planar magnetic fields in said memory area affecting the remanent magnetization of said memory area for inducing in said enveloped conductive strip a signal whose polarity phase is indicative of the informational state of said memory area.

5. The method of fabricating on a substrate member a magnetizable memory element, comprising the steps of:

forming first and second apertures in said substrate member creating a web therebetween;

affixing to said substrate member and about said first and second apertures first and second layers of a magnetizable material, said first and second film layers forming first and second closed flux paths about said first and second apertures;

causing a first circuit member to be sandwiched between and enveloped by superposed portions of said first and second layers in the area of said web for forming a memory area thereby; and, forming said layers in the area of said web to have superposed sides overlapping said first circuit member for sandwiching and enveloping said first circuit member for forming at the sides of said first circuit member in the area of said web two closely coupled areas for creating a substantially closed circumferential flux path about said first circuit member.

6. The method of fabricating on a substrate member a magnetizable memory element, comprising the steps of:

forming first and second apertures in said substrate member creating a web therebetween;

affixing to said substrate member and about said first and second apertures first and second thin-ferromagnetic-film layers of a magnetizable material having single domain properties and possessing the characteristic of uniaxial anisotropy for providing an easy axis in the plane of said film layer and along which easy axis the film layer's remanent magnetization shall reside in a first or second and opposite direction, said first and second film layers forming first and second closed flux paths about said first and second apertures, respectively;

causing a first circuit member to be sandwiched between and enveloped by superposed portions of said first and second film layers in the area of said web for forming a memory area thereby; and, forming said film layers in the area of said web to have superposed sides overlapping said first circuit member for sandwiching and enveloping said first circuit member for forming at the sides of said first circuit member in the area of said web two closely coupled mated-film areas for creating a substantially closed circumferential flux path about said first circuit member that is parallel to said first and second film layers' easy axes.

7. The method of fabricating on a substrate member a magnetizable memory element, comprising the steps of:

forming first and second apertures in said substrate member creating a web therebetween;

affixing to said substrate member and about said first aperture a first thin-ferromagnetic-film layer of a magnetizable material having single domain properties and possessing the characteristic of uniaxial anisotropy for providing an easy axis in the plane of said film layer and along which easy axis the film layer's remanent magnetization shall reside in a first or second and opposite direction;

affixing to said first film layer and at least in the area of said web a first insulating layer;

affixing to said first insulating layer a first circuit member having a longitudinal axis orthogonal to said first film layer's easy axis and positioning along said first film layer in the area of said web for permitting sides of said first film layer to extend beyond said first circuit member;

affixing to said first circuit member a second insulating layer; and affixing to said substrate member and about said second aperture and to said second insulating layer and having a portion superposed said first film layer in the area of said web a second thin-ferromagnetic-film layer having magnetic characteristics similar to said first film layer for forming at the sides of said first circuit member in the area of said web two closely coupled mated-film areas with said first film layer for creating a substantially closed circumferential flux path about said first circuit member that is parallel to said first and second film layers' easy axes.

8. The method of fabricating on substrate member a magnetizable memory element, comprising the steps of:

forming first and second apertures in said substrate member creating a web therebetween;

affixing to said substrate member and about said first aperture a first thin-ferromagnetic-film layer of magnetizable material having single domain properties and possessing the characteristic of uniaxial anisotropy for providing in the plane of said film layer an easy axis along which the film layer's remanent magnetization shall reside in a first or second and opposite direction;

affixing to said first film layer and at least in the area of said web a first insulating layer;

affixing to said first insulating layer a first current conductive strip having a longitudinal axis that is oriented orthogonal to said first film layer's easy axis and that is positioned superposed said first film layer in the area of said web for providing overlapping sides of said first film layer that extend on both sides of said strip;

affixing to said first current conductive strip and at least in the area of said web a second insulating layer;

affixing to said substrate member and about said second aperture and having a portion positioned superposed a portion of said first film layer in the area of said web a second film layer having magnetic characteristics similar to said first film layer for forming closely coupled mated-film areas with said first film layer along opposing edges of said first current conducting strip which mated-film areas create a substantially closed circumferential flux path about said first current conducting strip wherein said first and second film layers' easy axes are aligned with said circumferential flux path;

affixing to said second film layer a first printed circuit member having an insulating layer intermediate said second film layer and a second current conductive strip supported thereby wherein said second current conductive strip is centered superposed said first and second film layers in the area of said web with its longitudinal axis oriented parallel to said first and second film layers' easy axes; and, affixing to said substrate member, on the opposite side from said first film layer, a second printed circuit member similar to said first printed circuit member wherein the current conductive strips of said first and second printed circuit members are aligned in a superposed, parallel arrangement enveloping said superposed first and second film layers' portions.

9. The method of forming on substrate member, partially by a continuous deposition process within an evacuatable enclosure, a magnetizable memory element, comprising the steps of:

forming first and second apertures in said substrate member creating a web therebetween;

vapor depositing upon said substrate member and about said first aperture a first thin-ferromagnetic-film layer of magnetizable material having single domain properties and possessing the characteristic of uniaxial anisotoropy for providing in the plane of said film layer an easy axis along which the film layer's remanent magnetization shall reside in a first or second and opposite direction;

vapor depositing upon said first film layer and at least in the area of said web a first metallic-diffusion-preventing insulating layer;

vapor depositing upon said first insulating layer in the area of said web a first current conductive strip having a longitudinal axis that is oriented orthogonal to said first film layer's easy axis and that is positioned superposed said first film layer at least in the area of said web for providing overlapping sides of said first film layer that extend on both sides of said strip;

vapor depositing upon said first current conductive strip a second metallic-diffusion-preventing insulating layer;

vapor depositing upon said second metallic-diffusion-preventing insulating layer and having a portion positioned superposed said first film layer at least in the area of said web a second film layer having magnetic characteristics similar to said first film layer for forming closely coupled mated-film areas with said first film layer along opposing edges of said first current conductive strip which mated-film areas create a substantially closed circumferential flux path about said first current conductive strip wherein said first and second film layers' easy axes are aligned with said circumferential flux path;

removing the partially formed memory element from the evacuatable enclosure;

affixing to said second film layer a first printed circuit member having an insulating layer intermediate said second film layer and a second current conductive strip supported thereby wherein said second current conductive strip is positioned superposed said first and second film layers in the area of said web with its longitudinal axis oriented parallel to said first and second film layers' easy axes; and, affixing to said substrate member, on the opposite side from said first film layer, a second printed circuit member similar to said first printed circuit member wherein the current conductive strips of said first and second printed circuit members are aligned in a superposed parallel arrangement enveloping said superposed portions of said first and second film layers.

References Cited

UNITED STATES PATENTS 3,305,845 2/1967 Grace et al. -------- 340—174

OTHER REFERENCES

Publication I: IBM Technical Disclosure Bulletin, "Memory Using Planar Magnetic Film Cores" by Middel Hoek, vol. 6, No. 12, May 1964, pp. 66–67.

BERNARD KONICK, *Primary Examiner.*

S. URYNOWICZ, *Assistant Examiner.*